United States Patent
Kamerbeek et al.

(10) Patent No.: US 9,161,652 B2
(45) Date of Patent: Oct. 20, 2015

(54) CAPSULE AND SYSTEM FOR PREPARING A BEVERAGE COMPRISING SOLUBLE SUBSTANCE

(75) Inventors: Ralf Kamerbeek, De Meern (NL); Cornelis van Bergen, Houten (NL); Hendrik Cornelis Koeling, Utrecht (NL); Angenita Dorothea van Loon-Post, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 568 days.

(21) Appl. No.: 13/325,790

(22) Filed: Dec. 14, 2011

(65) Prior Publication Data

US 2012/0251672 A1 Oct. 4, 2012

Related U.S. Application Data

(63) Continuation of application No. PCT/NL2009/050813, filed on Dec. 30, 2009.

(30) Foreign Application Priority Data

Jun. 17, 2009 (EP) .................................... 09162929

(51) Int. Cl.
    *B65D 85/804* (2006.01)
    *A47J 31/36* (2006.01)
    *A47J 31/40* (2006.01)

(52) U.S. Cl.
    CPC ............ *A47J 31/3628* (2013.01); *A47J 31/407* (2013.01); *B65D 85/8043* (2013.01)

(58) Field of Classification Search
    CPC . B65D 85/8043; A47J 31/3628; A47J 31/407
    See application file for complete search history.

(56) References Cited

U.S. PATENT DOCUMENTS

| | | | |
|---|---|---|---|
| 3,615,708 A | 10/1971 | Abile-Gal | |
| 4,321,139 A | 3/1982 | Auclair | |

(Continued)

FOREIGN PATENT DOCUMENTS

| | | |
|---|---|---|
| BY | 11308 C1 | 12/2008 |
| CA | 2181246 | 9/1995 |

(Continued)

OTHER PUBLICATIONS

Elert, G., Pressure in an Espresso Machine, The Physics Factbook, [on line] 2005—no month given, retrieved on Oct. 16, 2014. Retrieved from the Internet: URL:<http://hypertextbook.com/facts/2005/KennyNgo.shtml>.*

(Continued)

*Primary Examiner* — Rena L Dye
*Assistant Examiner* — Chaim Smith
(74) *Attorney, Agent, or Firm* — Foley & Lardner LLP

(57) ABSTRACT

An exchangeable capsule for preparing a predetermined quantity of beverage suitable for consumption is disclosed. The exchangeable capsule comprises a circumferential wall, a bottom, closing the circumferential wall at a first end, and a lid closing the circumferential wall at a second end opposite the bottom. The wall, the bottom and the lid enclose an inner space comprising beverage ingredient for preparing the beverage. The bottom comprises an entrance area for supplying fluid to the ingredient, wherein the lid comprises an exit area for draining beverage from the capsule. The beverage ingredient comprises at least a soluble substance. The exit area comprises an exit filter that is adapted to substantially prevent non-dissolved soluble substance from leaving the capsule. A system for preparing a beverage comprising such a capsule and a method for preparing a beverage is also disclosed.

18 Claims, 4 Drawing Sheets

(56) References Cited

U.S. PATENT DOCUMENTS

| | | |
|---|---|---|
| 4,417,504 A | 11/1983 | Yamamoto |
| 4,859,337 A | 8/1989 | Woltermann |
| 5,325,765 A | 7/1994 | Sylvan et al. |
| 5,840,189 A | 11/1998 | Sylvan et al. |
| D408,679 S | 4/1999 | Potts et al. |
| 6,079,315 A | 6/2000 | Beaulieu et al. |
| 6,082,247 A | 7/2000 | Beaulicu |
| 6,142,063 A | 11/2000 | Beaulieu et al. |
| 6,182,554 B1 | 2/2001 | Beaulieu et al. |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| D489,215 S | 5/2004 | Honan et al. |
| D502,362 S | 3/2005 | Lazaris et al. |
| D513,572 S | 1/2006 | Schaffeld et al. |
| 7,165,488 B2 | 1/2007 | Bragg et al. |
| D544,299 S | 6/2007 | Schaffeld et al. |
| D554,299 S | 10/2007 | Ragonetti et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,513,192 B2 | 4/2009 | Sullivan et al. |
| 7,523,695 B2 | 4/2009 | Streeter et al. |
| 7,543,527 B2 | 6/2009 | Schmed |
| 7,552,672 B2 | 6/2009 | Schmed |
| 7,640,845 B2 | 1/2010 | Woodnorth et al. |
| 7,856,920 B2 | 12/2010 | Schmed et al. |
| 2003/0172813 A1 | 9/2003 | Schifferle |
| 2004/0045443 A1 | 3/2004 | Lazaris et al. |
| 2005/0003060 A1* | 1/2005 | Steenhof et al. .............. 426/425 |
| 2005/0051478 A1 | 3/2005 | Karanikos et al. |
| 2005/0158426 A1 | 7/2005 | Hu et al. |
| 2005/0205601 A1 | 9/2005 | Taylor |
| 2005/0287251 A1 | 12/2005 | Lazaris et al. |
| 2006/0174773 A1 | 8/2006 | Taylor |
| 2006/0292012 A1 | 12/2006 | Brudevold et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2009/0126577 A1 | 5/2009 | Ternite |
| 2010/0024658 A1 | 2/2010 | Jacobs et al. |
| 2010/0303964 A1 | 12/2010 | Beaulieu et al. |

FOREIGN PATENT DOCUMENTS

| | | |
|---|---|---|
| CH | 434 609 | 10/1967 |
| CN | 1126462 | 7/1996 |
| CN | 101263066 | 9/2008 |
| CN | 101316772 | 12/2008 |
| EP | 0844195 | 5/1998 |
| EP | 1 101 430 | 5/2001 |
| EP | 1 555 219 | 7/2005 |
| EP | 1 579 791 | 9/2005 |
| EP | 1 839 543 | 10/2007 |
| FR | 2 617 389 | 1/1989 |
| RU | 2337601 | 11/2008 |
| RU | 2350243 | 3/2009 |
| WO | WO-03/059778 | 7/2003 |
| WO | WO-2004/064582 | 8/2004 |
| WO | WO-2004/083071 | 9/2004 |
| WO | WO-2006/078162 | 7/2006 |
| WO | WO-2006/111807 | 10/2006 |
| WO | WO 2008/012202 | 1/2008 |
| WO | WO-2008/117329 | 10/2008 |
| WO | WO 2008/121489 | 10/2008 |
| WO | WO-2008/132571 A1 | 11/2008 |
| WO | WO-2008/148650 | 12/2008 |

OTHER PUBLICATIONS

Office Action for Japanese Application No. 2012-516021, mail date Aug. 7, 2013, 4 pages.
English Translation of Office Action for Chinese Application No. 200980160987.0, mail date Nov. 15, 2013, 10 pages.
English Translation of Search Report for Chinese Application No. 200980160987.0, dated Nov. 1, 2013, 3 pages.
Office Action for European Application No. 09796106.4-1656, dated Dec. 6, 2014, 4 pages.
European Office Action for European Application No. 09796106.4, dated May 7, 2013, 4 pages.
Japanese Office Action and English Translation for Japanese Application No. 2012-516002, dated Aug. 6, 2013, 6 pages.
International Search Report for PCT Application No. PCT/NL2009/050813, completed Feb. 19, 2010, 5 pages.
English Translation of Russian Office Action for Russian Patent Application No. 2012101439/12, dated Apr. 16, 2014, 7 pages.
Second Office Action and English Translation for Chinese Patent Application No. 2009801609870, dated Jul. 2, 2014, 29 pages.

* cited by examiner

CAPSULE AND SYSTEM FOR PREPARING A BEVERAGE COMPRISING SOLUBLE SUBSTANCE

CROSS-REFERENCE TO RELATED APPLICATIONS

The present application is a continuation of International Patent Application No. PCT/NL2009/050813 filed on Dec. 30, 2009; which claimed priority to European Application No. EP09162929.5 filed on Jun. 17, 2009—both of which are hereby incorporated herein by reference.

BACKGROUND

The invention relates to an exchangeable capsule for preparing a predetermined quantity of beverage suitable for consumption, comprising a circumferential wall, a bottom, closing the circumferential wall at a first end, and a lid closing the circumferential wall at a second end opposite the bottom, wherein the wall, the bottom and the lid enclose an inner space comprising beverage ingredient for preparing the beverage, wherein the bottom comprises an entrance area for supplying fluid to the ingredient, wherein the lid comprises an exit area for draining beverage from the capsule.

The invention further relates to a system for preparing a predetermined quantity of beverage suitable for consumption comprising such an exchangeable capsule.

Such systems are known per se. Such a known system can for instance comprise an espresso-type coffee machine and a closed capsule comprising the beverage ingredient. The system is intended for extraction under pressure, wherein the beverage ingredient can contain a substance for the preparation of a drink chosen from roasted and ground coffee, tea and soluble coffee. A special class of these known systems is used for preparing the beverage using a hermetically sealed capsule comprising the extractable product. During beverage preparation the entrance area of such hermetically sealed capsule is pierced, hence providing at least one entrance opening for supplying the fluid under pressure to the beverage ingredient in the inner space of the capsule through the entrance opening. Providing the fluid under pressure to the inner space causes the pressure in the inner space of the capsule to rise. This, in turn, causes the exit area of the capsule to be pressed against lid piercing means present in the receptacle. When the exit area is pressed against the lid piercing means with sufficient force, the exit area tears against the lid piercing means creating at least one exit opening through which the beverage can drain from the capsule. Such capsules can contain a substance for the preparation of a beverage chosen from ground roasted coffee, tea, instant coffee, a mixture of ground coffee and of instant coffee, a chocolate base product and the like.

It has been found, however, that in the above known systems preparing of a beverage using a capsule containing soluble beverage ingredients results in uncontrolled preparing of the beverage. Due to the build up pressure inside the capsule the exit area from the hermetically sealed capsule is pressed against the lid piercing means. This results in tearing of the outlet side of the capsule in an uncontrolled manner, which can result in a beverage of inferior quality since the soluble beverage ingredient might not be dissolved completely when the prepared beverage leaves the capsule. Furthermore, due to the torn exit area non-dissolved beverage ingredient can leave the capsule at the same time as prepared beverage from dissolved beverage ingredient and the fluid. This can lead to undesired non-dissolved beverage ingredient flowing into the container of prepared beverage thereby influencing the quality of the prepared beverage.

SUMMARY

It is an object of the invention to improve the above system, and more specifically to at least diminish the above problem.

Thereto, according to a first aspect of the invention, an exchangeable capsule is provided wherein the beverage ingredient comprises at least a soluble substance, and wherein the exit area of the lid of the capsule comprises an exit filter through which the beverage can drain from the capsule.

Having such an exit filter prevents tearing of the lid of the capsule and thus results in a more controlled preparation of the beverage. Moreover, the exit filter may prevent fouling of the system by preventing egress of soluble substance from the capsule in non-dissolved form. Thus providing the exit filter may improve the quality of the prepared beverage. At the same time, the exit filter can prevent that the apparatus for preparing the beverage will be soiled by non-dissolved substance, possibly preventing bacteria to grow near the outlet of the apparatus resulting in a hygienic way of preparing a beverage from soluble substance.

Preferably, the exit filter has a sufficiently high tear strength and/or forming a sufficiently low flow resistance that the capsule when in use inserted in a known apparatus of a known system, in use, is not pierced by the lid piercing means of said apparatus and the lid stays intact. It has been found that the exit filter having the sufficiently high tear strength and/or forming the sufficiently low flow resistance does not tear against the lid piercing means. Thus, the exit filter forms a, optionally uniform, exit area through which the prepared beverage can leave the capsule. This provides the advantage that it is possible for the beverage to leave the capsule over a larger area than when exit openings are formed by piercing the lid, at the same time diminishing the risk of preferential fluid paths occurring in the soluble substance in the capsule. This provides the advantage that a maximum amount of soluble beverage ingredient will be dissolved, thereby increasing the beverage quality and further preventing non-dissolved substance from leaving the capsule. Further, the capsule not being pierced by the lid piercing means, and staying intact, provides the advantage that a predetermined pore and/or exit hole size and distribution of the exit filter, defining exit openings of the exit filter, remains intact, so that the size and distribution of exit openings does not depend on chance, as when the exit openings are formed by piercing. Furthermore, it has been found that providing the exit filter also reduces the risk of non-dissolved beverage ingredient spilling from the capsule when removing the capsule from the apparatus. It is noted that a known apparatus at least comprises a receptacle for holding an alternative capsule, e.g. a hermetically sealed capsule, and a fluid dispensing device for supplying an amount of fluid, such as water, under pressure to the alternative capsule via the entrance area of the capsule, wherein the receptacle comprises lid piercing means intended for piercing the exit area of the alternative capsule, when the exit area sufficiently presses against the lid piercing means under the influence of the pressure of the fluid and/or beverage in the capsule for creating at least one exit opening through which the beverage can drain from the alternative capsule. It is further noted that the known system comprises such a known apparatus and an alternative capsule, e.g. a hermetically sealed capsule.

In further elaboration of the invention, the exit filter can comprise a porous layer, for instance a layer of paper filtering material or a layer of non-woven material, for instance comprising polymeric fibers, or a perforate layer, such as polymeric film, provided with a plurality of exit openings. The exit filter may also be a multi-layer filter.

Such a layer provides sufficiently large pores or openings for the prepared beverage to leave the capsule in a controlled manner but at the same provides sufficiently small pores or openings to prevent the non-dissolved beverage ingredient from leaving the capsule. When using a filtering paper layer a low-cost exit filter is provided. Moreover, parameters of the filtering paper, such as density, thickness and/or PE-content, can easily be chosen to provide the exit filter having the sufficiently high tear strength and/or forming a sufficiently low flow resistance.

According to a further aspect of the invention, the soluble substance can be at least one of instant chocolate powder, instant coffee powder, instant milk powder, instant flavoring powder, such as mocha, amaretto, and the like soluble substance. It is also possible that the beverage ingredient also comprises an extractable ingredient such as roast and ground coffee. By providing capsules comprising at least one of said ingredients, for every user alternately a desired kind of beverage can be prepared without much effort. Only a capsule comprising the desired kind of beverage ingredient has to be placed in the apparatus and the apparatus provides the desired beverage. The capsule is suited for preparing a predetermined amount of beverage by supplying a predetermined amount of hot water under high pressure to the capsule, thereby dissolving the soluble beverage ingredient in the supplied water. For instance, the exchangeable capsule comprises a predetermined amount of beverage ingredient, for instance 4-8 grams, preferably approximately 5 grams of soluble beverage ingredient, and thus is suitable and intended, for preparing a single portion of the beverage, preferably a single cup of the beverage, e.g. from 30-200 ml of the prepared beverage. The exchangeable capsule, thus, is a single-portion-pack. Between changing of capsules, thus after a beverage has been prepared, the apparatus does not need to be cleaned extensively, since the exit filter prevents the apparatus from getting soiled by non-dissolved substance as described before.

Therefore, it can be advantageous if, according to a further aspect of the invention, the entrance area comprises an entrance filter, for instance of a porous sheet, such as a sheet of paper or the like non-woven material or a perforate sheet, such as a polymeric film provided with a plurality of entrance openings, for supplying the fluid to the extractable product there through. By providing the capsule with both an entrance filter and the exit filter, the capsule does not need to be pierced at the bottom as well, thereby further decreasing the risk of non-dissolved beverage ingredient leaving the capsule, for instance during removing of the capsule from the apparatus, thereby further preventing soiling of the apparatus. Furthermore, this provides the advantage that the risk of preferential fluid paths occurring in the beverage ingredient in the capsule is decreased resulting in better dissolving of beverage ingredient, providing a better quality beverage. In an embodiment of the system according to the invention, the entrance filter extends over substantially the entire surface of the bottom of the capsule, thereby providing the advantage that the fluid can be supplied to substantially the entire cross section of the inner space. Hence, the soluble substance is wetted very homogeneously resulting in maximum dissolving of the soluble substance.

In another embodiment of the invention, the capsule may be provided with a disturbing element for creating a swirl or vortices or an otherwise non-laminar flow. By providing such a disturbed flow in the capsule, the soluble substance may be dissolved more and/or better and remaining non-dissolved substance in the capsule may be minimized. The disturbing element may for example comprise a tree-like structure extending from the entrance of the capsule to the exit of the capsule. Branches of the tree-like structure may be arranged as to create a vortex or a swirl or an otherwise non-laminar flow in the capsule. The disturbing element may for example also comprise a 'labyrinth'-like structure arranged upstream of the exit layer such that accumulation of soluble substance may be prevented and/or mixing and/or dissolving of the substance may be improved. The disturbing element may for example also comprise a grid-like structure. Also, the disturbing element may be a spiral structure and/or a vane structure to e.g. create a vortex in the flow inside the capsule to improve dissolving of the soluble substance. Alternatively and/or additionally, the soluble substance may be mixed with coffee grains to improve dissolving of the soluble substance.

Preferably, the disturbing element comprises at least a structural component approximately transverse to the axial direction of the capsule and/or a structural component that induces a flow velocity component in a direction approximately transverse to the axial direction of the capsule, e.g. in radial direction or in circumferential direction to initiate disturbance of the flow. For example, a vane may be substantially two-dimensional and may be arranged upwardly axially in one direction and at an angle to the radial direction in another direction. Also, a grid comprising e.g. transverse grid bars, may be arranged substantially parallel to e.g. the exit layer. At least a part of the transverse grid bars may be arranged at an angle to the radial direction, thereby inducing at least a flow velocity component transverse to the axial direction and thus disturbing the flow. Many variants and combinations are possible.

In another embodiment of the invention, at least part of the beverage ingredient can be compacted into a tablet of which the compaction is such that the beverage ingredient substantially dissolves during fluid supply. This provides the advantage that the risk of non-dissolved beverage ingredient remaining inside the capsule decreases. Furthermore, the occurrence of preferential flow paths in the compacted soluble beverage ingredient tablet is reduced, thereby further increasing the dissolving rate of the beverage ingredient during fluid supply. By providing the beverage ingredient in compacted tablet form into the capsule, the capsule can be easily manufactured. In a further elaboration of the capsule according to the invention, the capsule can also comprise a plurality of tablets, wherein each tablet for instance is of a different beverage ingredient. By providing different beverage ingredients in different tablets, different kinds of capsules to be used to prepare different kind of beverages can be easily manufactured. It is also possible that the tablets have mutually different degrees of compacting. The plurality of tablets may for example be separated by permeable films and/or layers. Alternatively and/or additionally, the separating film and/or layer between tablets may be soluble itself, for example soluble at a different dissolving rate than the tablets. It is for instance possible that the degree of compacting increases per tablet in the direction from the bottom to the lid of the capsule. In this way the effort required to completely wet a tablet will also increase in the direction from the bottom to the lid, ensuring that each upstream tablet has been properly wetted when wetting a more downstream tablet, thus providing very homogeneous wetting of the total volume of the soluble beverage ingredient, thereby enhancing dissolving of the beverage ingredient during fluid supply.

In an embodiment of the invention, the capsule may be arranged in different compartments wherein for example each compartment may comprise a different soluble substance.

Also, each compartment may comprise disturbing elements for improving dissolving of the soluble substance. The compartments may be arranged circumferentially next to each other or may be arranged axially next to each other, for example that the soluble substance in an upstream compartment first dissolves before the soluble substance in a downstream compartment dissolves. Many variants and combinations are possible.

According to a further embodiment of the invention, it is advantageous if the entire inner space of the capsule is occupied by the at least one beverage ingredient, resulting in a capsule that can be manufactured from a minimum required amount of material, thereby decreasing the total cost of the capsule. Furthermore, this provides the advantage that the soluble substance can not be displaced inside the inner space of the capsule when fluid flows through the capsule so that risk of forming of preferential fluid flow paths through the substance decreases.

In a further advantageous elaboration of the invention, the circumferential wall of the capsule may be substantially rigid. This provides the advantage that the capsule is not prone to be deformed prior to use, so that the capsule can fit into the receptacle without problems. Furthermore, little chance of deformation is advantageous because beverage ingredient will not accidentally be forced out of the capsule due to such deformation, thereby preventing that with such a deformed capsule a cup of inferior quality beverage is prepared.

In a special embodiment of the invention, the capsule further comprises a lid seal and/or a bottom seal at least partially removable connected the lid and/or the bottom, respectively, for sealing the exit filter and/or the entrance filter, respectively, prior to use. Hence, entering of air into the inner space via the entrance filter and/or via the exit filter prior to use of the capsule may be prevented, improving shelf life of the product inside the capsule. Furthermore, it is prevented that moist enters the inner side of the capsule prior to use of the capsule. Moist can lead to cluttering of the soluble beverage ingredient, thereby increasing risk of non-dissolving of the beverage ingredient in a desired manner possibly resulting in an inferior beverage quality.

The invention also relates to a method for preparing a beverage using such an exchangeable capsule.

BRIEF DESCRIPTION OF THE DRAWINGS

The invention will now be further elucidated by means of, non-limiting, examples referring to the drawing, in which.

It is noted that identical or corresponding elements in the different drawings are indicated with identical or corresponding reference numerals.

DESCRIPTION OF EXEMPLARY EMBODIMENTS

Figure 1:
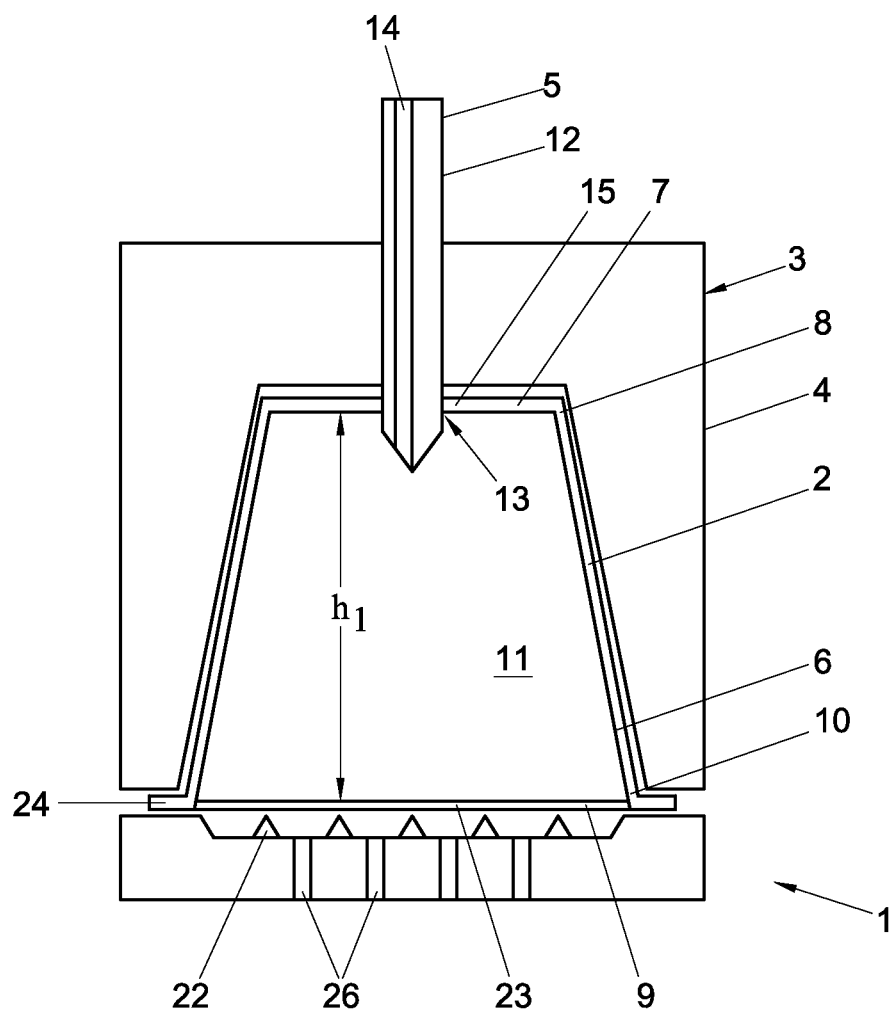
FIG. 1 shows a system for preparing a beverage according to a first embodiment of the invention.

FIG. 1 shows an example of a first embodiment of a system 1 according to the invention for preparing a predetermined quantity of beverage suitable for consumption using a beverage ingredient comprising at least a soluble substance. The system 1 comprises an exchangeable capsule 2, and an apparatus 3. The apparatus 3 comprises a receptacle 4 for holding the exchangeable capsule 2. In this example, the receptacle 4 has a shape complementary to the shape of the capsule 2. In FIG. 1 a gap is drawn between the capsule 2 and the receptacle 4 for clarity. It will be appreciated that, in use, the capsule 2 may lie in contact with the receptacle 4. The apparatus 3 further comprises a fluid dispensing device 5 for supplying an amount of a fluid, such as water, under pressure to the exchangeable capsule 2.

In the system 1 shown in FIG. 1, the exchangeable capsule 2 comprises a circumferential wall 6, a bottom 7 closing the circumferential wall 6 at a first end 8, and a lid 9 closing the circumferential wall 6 at a second end 10 opposite the bottom 7. The circumferential wall 6, the bottom 7 and the lid 9 enclose an inner space 11 comprising the beverage ingredient such as instant chocolate powder, instant coffee powder, instant milk powder, instant flavoring powder, such as mocha, amaretto, and the like soluble substance. In another embodiment of the capsule 2 according to the invention, the capsule 2 may additionally comprise an extractable ingredient such as roast and ground coffee. Such a capsule 2 with combined content can for instance be used to prepare coffee with milk, coffee with a flavor like vanilla or coffee with sugar or the like beverages. An advantage of such a combined capsule 2 is that a user can prepare a desired beverage with little effort by only choosing the correct capsule 2 before preparing the beverage. In this example, the exchangeable capsule 2 comprises an amount of soluble substance, for instance between 4-8 gram, preferably approximately 7 grams, suitable for preparing a single portion of the beverage, preferably a single cup of the beverage, e.g. from 30-200 ml of the prepared beverage. The exchangeable capsule 2, thus, is a single-portion-pack. The system 1 comprises bottom piercing means 12 intended for piercing the capsule 2. FIG. 1 shows the bottom piercing means 12 in an extended position for creating an entrance opening 13 in the bottom 7, more specific in the entrance area 15 of the bottom 7. Through the entrance opening 13, the fluid can be supplied to the soluble substance contained in the inner space 11 of the capsule 2 under a pressure of approximately 4-20 bars. The piercing means 12 comprise a bore 14 through which the fluid from the fluid dispensing device 5 can be supplied to the soluble substance.

According to an aspect of the invention, the system 1 of FIG. 1 comprises lid piercing means 22 intended for piercing an exit opening of a prior art capsule, being a hermetically sealed capsule comprising a lid that is adapted to be torn against the bottom piercing means under the influence of internal pressure in the capsule provided by the fluid in the capsule. According to the invention, the lid 9 of the capsule 2 comprises an exit filter 23, through which the beverage can drain from the capsule 2. The exit filter 23 is arranged to having a sufficiently high tear strength not to be pierced by the lid piercing means 22 under the influence of the pressure inside the capsule 2. Alternatively, or additionally, the exit filter 23 forms a sufficiently low flow resistance for the beverage exiting the capsule 2, that the exit filter 23 is not pressed against the lid piercing means 22 with sufficient force to be pierced by the lid piercing means 22 and the lid stays intact. Hence, the exit filter 23 is adapted to the lid piercing means 22 such that the capsule 2, in use, is not pierced by the lid piercing means 22 and the lid 9 stays intact. More in general it applies that the exit filter 23 and the lid piercing means 22 are adapted to each other such that the capsule 2, in use, is not pierced by the lid piercing means 22 and the lid 9 stays intact.

Figure 3:
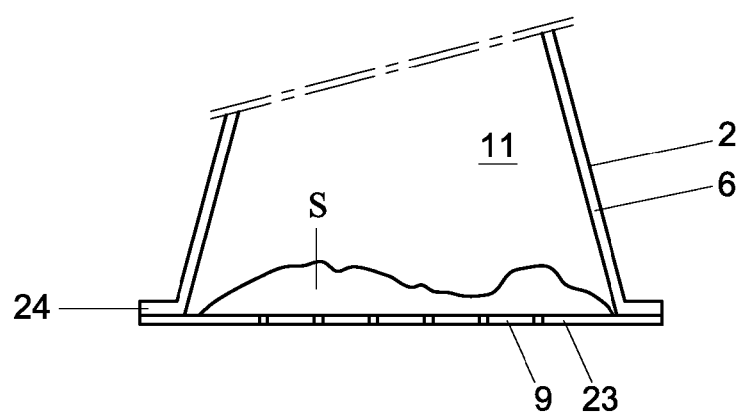
FIG. 3 shows a partial schematic cross sectional view of a capsule according to the invention.

In the example of FIG. 1 the exit filter 23, forming an exit area of the capsule 2, through which the beverage, for instance coffee, can drain from the capsule, is formed by a porous sheet, such as filter paper. In this example the entire lid 9 is formed as the exit filter 23. In the example of FIG. 1, the capsule 2 comprises an outwardly extending rim 24 at the second end 10, wherein the lid 9 is attached to the outwardly extending rim 24, e.g. by gluing, welding or the like. Hence, in this example the exit filter 23, i.e. the porous sheet, is attached to the outwardly extending rim 24. The exit filter 23 prevents non-dissolved beverage ingredient from leaving the capsule 2 for instance during or after preparing of the beverage or during removing of the used capsule 2 from the apparatus 3, thereby preventing soiling of the apparatus 3 and at the same time preventing undesired lumps of non-dissolved substance S entering the container together with the prepared beverage (see FIG. 3).

In an embodiment (not shown), the capsule may be provided with disturbing elements to improve dissolving of the substance and to minimize non-dissolved substance remaining in the capsule. The disturbing element may for example be a spiral structure or a vane structure or a tree-like structure or a labyrinth-type structure or a structure otherwise disturbing the flow in the capsule.

In this example the exit filter 23 forms a substantially continuous fluid-permeable sheet spanning substantially the entire second, open end 10 of the capsule 2. Thus, the fluid can drain from the capsule 2 over a large area. Hence, a very homogeneous drain of beverage from the soluble substance product is obtained. Thus, the risk of occurrence of preferential paths via which the fluid flows through the extractable product is greatly reduced.

In general, parameters of the exit filter 23 of the capsule 2 of the system 1 according to the invention can be chosen such that the exit filter 23 does not tear or rupture, e.g. has the sufficiently high tear strength and/or forming the sufficiently low flow resistance not to be pierced or torn. It will be appreciated that the lid 9 and/or the exit filter 23 may deform against the lid piercing means 22, although it will not rupture or be torn. When the exit filter 23 is e.g. made of filtering paper, parameters of the filtering paper, such as density, thickness and/or PE-content, can easily be chosen to provide the exit filter having the sufficiently high tear strength and/or forming the sufficiently low flow resistance. The exit filter may e.g. be a multi-layer filter. Alternatively, when the exit filter 23 is e.g. formed by a polymeric film provided with a plurality of exit openings, parameters of the polymeric foil, such as density, thickness, number of exit openings, size and/or shape of exit openings, can easily be chosen to provide the lid 9 having the sufficiently high tear strength and/or forming the sufficiently low flow resistance and at the same time to prevent egress of non-dissolved substance from the capsule 2.

In the example of FIG. 1, the lid piercing means 22 are shown having sharp toothed points intended for piercing the lid 9. It will be appreciated that, alternatively, the lid piercing means 22 may have blunt piercing surfaces, e.g. as indicated with dashed lines in FIG. 2. In such embodiment, a mentioned prior art capsule may, nevertheless, be pierced by the blunt piercing means 22, e.g. when the lid consists of a sheet of aluminum foil. Parameters of the exit filter 23 of the capsule 2 of the system 1 according to the invention can be chosen such that the exit filter 23 has the sufficiently high tear strength and/or forms the sufficiently low flow resistance not to be pierced or torn. It will be appreciated that when the lid piercing means 22 are blunt, the parameters of the exit filter 23 may be chosen to suit these blunt piercing means. When the piercing means 22 are blunt, the exit filter 23 may e.g. be thinner than when the lid piercing means 22 are sharp, while guaranteeing that the exit filter 23 has the sufficiently high tear strength and/or forming the sufficiently low flow resistance not to be pierced or torn.

The system 1 is operated as follows for preparing a cup of coffee, wherein the soluble substance is instant coffee powder. The capsule 2 is placed in the receptacle 4. The bottom piercing means 12 are activated to pierce the bottom 7 of the capsule 2 for creating the entrance opening 13. The fluid, here hot water under pressure, is supplied to the instant coffee powder in the inner space 11 through the entrance opening 13. The water will wet the instant coffee powder and substantially dissolve the coffee powder to form the coffee beverage. During supplying the water under pressure to the inner space 11, the pressure inside the capsule 2 will rise. When the pressure reaches a predetermined level, coffee beverage will drain from the capsule 2 through the pores of the exit filter 23 and outlets 26 of the receptacle 4, and may be supplied to a container such as a cup (not shown).

Figure 2:
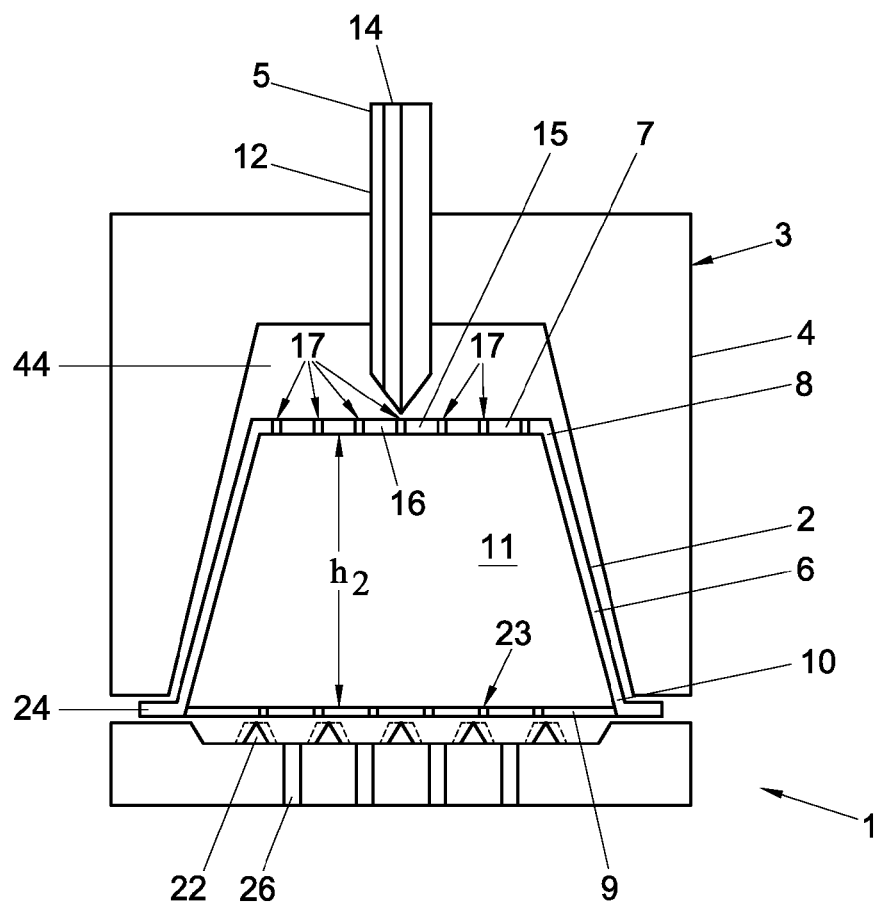
FIG. 2 shows a second embodiment of a system according to the invention.

In FIG. 2 a second embodiment of the system 1 according to the invention is shown that operates substantially similar as the system described with FIG. 1. For the sake of clarity, only the elements that differ from the system 1 as shown and described with FIG. 1 will be described here in detail. In the system as shown in FIG. 2, the piercing means 12 comprise a bore 14 through which the fluid is supplied to the inner space 44 of the receptacle 4. The fluid, here hot water under a pressure of e.g. more than four bars, will flow through an entrance filter 16 into the inner space 11 of the capsule 2 for dissolving desired substances from the soluble beverage ingredient, in this example approximately 4 to 8 grams of instant coffee, for preparing, in this example the single cup of the beverage, here coffee.

Thus, more in general, in the example of FIG. 2, the bottom 7 comprises an entrance area 15, formed by the entrance filter 16, and the system 1 is arranged for bringing the fluid dispensing device 5 in fluid connection with the entrance area 15 for supplying the fluid to the soluble product to prepare the beverage.

According to the invention, the entrance filter 16 is positioned at a distance from the bottom piercing means 12, such that the capsule 2 is not pierced by the bottom piercing means 12 and the bottom 7 stays intact when the bottom piercing means 12 is brought in the extended position (as shown in FIG. 2). Thus, the capsule 2 has a height h2 that is smaller than height h1 of the capsule 2 as shown in FIG. 1. This prevents or at least minimizes non-dissolved substance from leaving the capsule 2 via the entrance area 15, for instance during removing of the capsule 2 from the apparatus 3 after preparing the beverage.

The capsule 2 as shown in FIG. 2, comprises a circumferential wall 6 that is substantially rigid. The circumferential wall may e.g. comprise a plastics material and may be formed by e.g. injection molding, vacuum-forming, thermoforming or the like. In the example of FIG. 2 the bottom 7 is integral with the circumferential wall 6. In this example the entrance filter 16 is formed by a plurality of entrance openings 17 in the bottom 7. In this example the plurality of entrance openings 17 is distributed over substantially the entire bottom 7. Thus, the fluid is supplied to the soluble product via the plurality of entrance openings 17, which causes the soluble ingredient to be wetted over substantially the entire cross section of the capsule 2. Hence, a very homogeneous supply of fluid to the soluble product is obtained. Thus, also the risk of occurrence of preferential paths via which the fluid flows through the soluble product is greatly reduced, thereby providing a high dissolving rate of the soluble substance. The capsule 2 can be of a biodegradable material such that the capsule 2 after preparing the beverage can be thrown away without having considerable impact on the environment.

In the example of the system 1 as shown in FIG. 2, the lid piercing means 22 comprise ridges against which the lid 9, in use, abuts. Such ridges may be formed by the blunt piercing means 22 as shown with dashed lines in FIG. 2. The ridges may e.g. form at least 10%, possibly at least 25% of the portion of the surface of the receptacle 4 which, in use, coincides with the portion of the surface area of the lid 9 overlying the second, open, end 10. Hence, in use, the lid 9 may be supported by the ridges over, e.g. at least 10%, preferably at least 25%, of the portion the surface area of the lid 9 overlying the second, open, end 10. As already indicated, the lid 9 of a prior art hermetically sealed capsule may be pierced by such ridges, whereas parameters of the exit filter 23 of the capsule 2 of the system 1 according to the invention may easily be chosen such that the exit filter 23 has the sufficiently high tear strength and/or forms the sufficiently low flow resistance not to be pierced or torn. The exit filter 23 is formed by a flexible foil comprising exit openings. It is noted that the exit filter 23 may instead be formed by the flexible porous sheet, such as filter paper, like the capsule 2 in FIG. 1. It will be appreciated that when the lid piercing means 22 comprise ridges, the parameters of the exit filter 23 may be chosen to suit such lid piercing means 22.

In the example of FIG. 2, the ridges comprise edges which are not sharp. In this example a radius of curvature of the edges is approximately 50 μm, although other radii are conceivable, such as 100, 200 or 500 μm. It is also possible that the ridges of the lid piercing means 22 have a convex top against which the lid 9 abuts. Hence, when the lid 9, in use, is pressed against the ridges, the surface area over which the lid 9 is supported by the ridges increases, thus reducing the local pressure exerted on the lid 9 by the ridges. Thus it is possible to provide, in an easy manner, that the lid 9, in use, does not tear and/or rupture and stays intact.

FIGS. 4-7 show further embodiments of the capsules 2 according to the invention, which capsules 2 can be used in an apparatus 3 of the system 1 as described with FIGS. 1 and 2.

Figure 4:
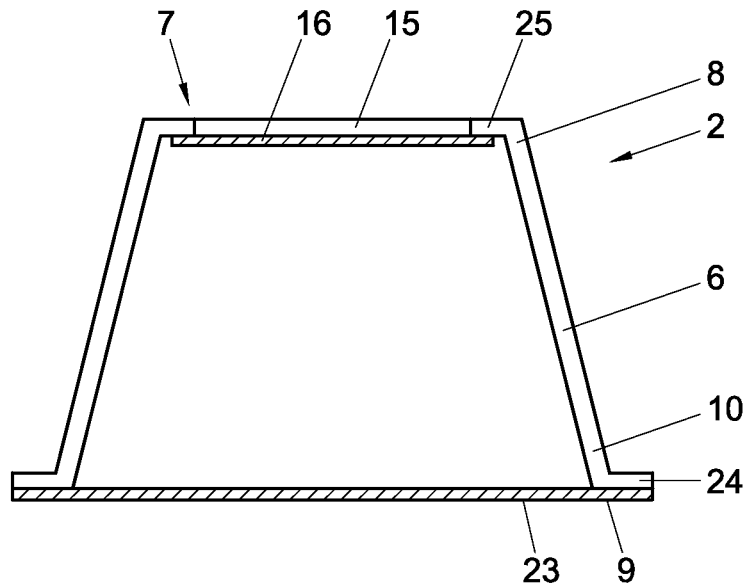
FIG. 4 shows a schematic cross sectional view of a second embodiment of a capsule according to the invention.

In FIG. 4 the entrance filter 16 is also formed by a flexible porous sheet, such as filter paper. In this example the entrance filter 16 is attached to an inwardly extending rim 25. In this example, the entrance filter 16 is attached to the inner side of the inwardly extending rim 25. This maximizes the internal volume of the capsule 2, as the rim thickness is not present in the inner space 11 of the capsule 2.

Figure 5:
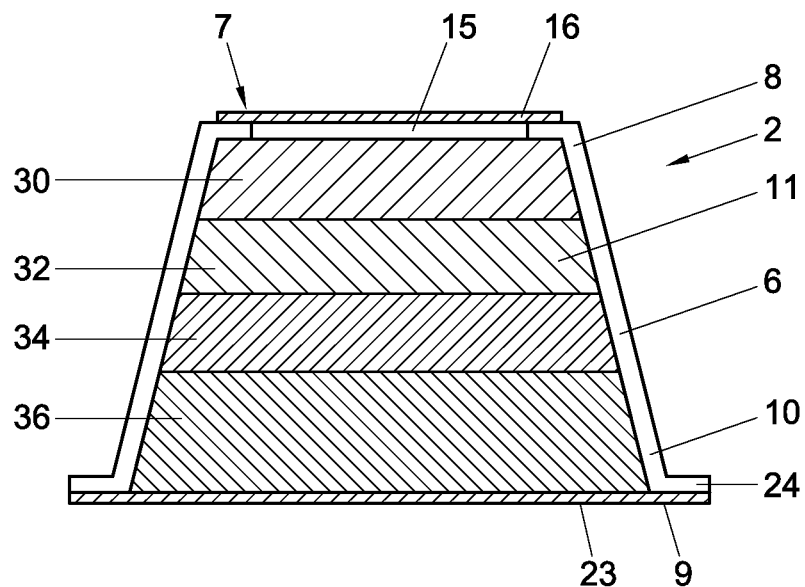
FIG. 5 shows a schematic cross sectional view of a third embodiment of a capsule according to the invention.

In FIG. 5 the exit filter 23 is formed by the flexible porous sheet, such as filter paper, like in FIGS. 1-4. In FIG. 5 the entrance filter 16 is also formed by a flexible porous sheet, such as filter paper. In this example, the entrance filter 16 is attached to the outer side of the inwardly extending rim 25. Hence, the risk is reduced that the fluid under pressure tears the entrance filter 16 from the inwardly extending rim 25. It is possible that the entrance filter 16 overhangs a circumferential edge of the bottom 7. Hence, a larger surface area is available for attaching the entrance filter 17 to the bottom 7 and the circumferential wall 6, resulting in a stronger bond. The beverage ingredient provided in the capsule 2 according to an embodiment of the invention can be compacted into a tablet of which the compaction is such that the beverage ingredient substantially dissolves during fluid supply. The capsule 2 according to the embodiment as shown in FIG. 5 comprises a plurality of such compacted tablets 30, 32, 34, 36, stacked in the inner space 11 of the capsule 2. The tablets 30, 32, 34, 36 can each have a different compaction rate so as to influence the dissolving process of the beverage ingredient such that preferably the entire beverage ingredient dissolves during beverage preparation. Furthermore, these tablets 30, 32, 34, 36 having different compaction rates, thus different density, can increase the flow resistance towards the exit filter 23, thereby providing a better pressure build up in the capsule 2 such that the soluble substance can dissolve properly. The density of the tablets 30, 32, 34, 36 can increase in the direction from the bottom 7 to the lid 9. This provides the advantage that the fluid will more easily wet a tablet of lower density than a tablet of higher density, so that each upstream tablet is properly wetted while the water wets a subsequent downstream tablet. Thus, highly homogeneous wetting of the soluble product is achieved. Although the example shows four stacked tablets, it will be appreciated that any number of tablets may be used.

It is also possible that each tablet 30, 32, 34, 36 comprises a different beverage ingredient, such as different soluble substances or a combination of soluble substances and an extractable product like roast and ground coffee. Each tablet 30, 32, 34, 36 can span substantially the entire cross section of the capsule 2.

Figure 6:
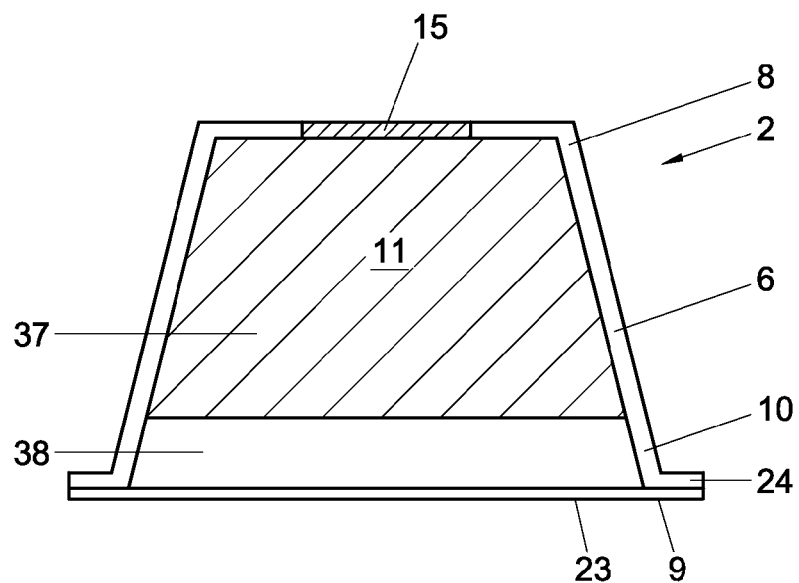
FIG. 6 shows a schematic cross sectional view of a fourth embodiment of a capsule according to the invention.

FIG. 6 shows a further embodiment of a capsule 2 according to the invention. The capsule 2 according to this example comprises a single tablet 38 of compacted soluble product. The tablet 38 is provided adjacent the exit filter 23. Between the compacted tablet 38 and the bottom 7 of the capsule 2 a further amount of soluble substance 37 or an amount of extractable product is provided. In FIG. 6 the exit filter 23 is also formed by a non-woven material layer. The entrance area 15 is arranged to be pierced by the piercing means 12 (see FIG. 1) to form the entrance opening 13.

Figure 7:
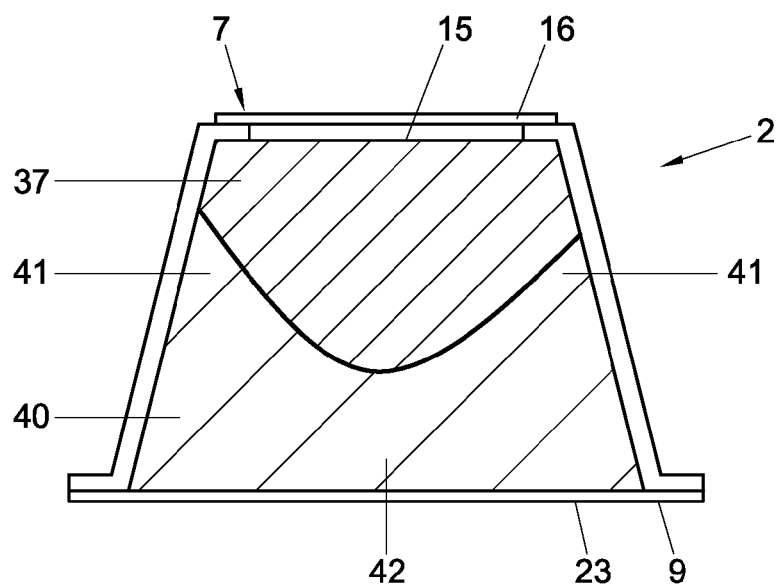
FIG. 7 shows a schematic cross sectional view of a fifth embodiment of a capsule according to the invention.

In FIG. 7 another embodiment of the capsule 2 according to the invention is shown. The capsule 2 comprises a tablet 40 of compacted beverage ingredient. The tablet 40 has a cross sectional shape such that the fluid flow within the capsule 2 can be determined. In this case, the outer circumferential wall 41 of the tablet extends from the side of the tablet 42 facing the exit filter 23 towards the bottom 7 of the capsule 2. Of course other (cross sectional) shapes of the tablet 40 can be possible to determine certain beverage preparing properties of the capsule 2, such as fluid flow paths or how the soluble beverage ingredient dissolves during fluid supply.

In the example of FIG. 7 the entrance filter 16 and exit filter 23 of the capsule 2 are substantially as shown in FIG. 5. It will be appreciated that the tablet 40 or plurality of tablets 30, 32, 34, 36 as shown in FIG. 6 may be used in conjunction with any capsule 2 referred to hereinabove.

In all embodiments of FIGS. 1-7 the exit filter 23 is formed by a flexible sheet-shaped material. More specifically, in all embodiments of FIGS. 1-7 the lid 9 is solely formed by the flexible sheet-shaped material. It has been found that in general no supporting structure, such as a substantially rigid grid, e.g. downstream of the exit foil, is required to support the exit foil to prevent the exit foil from tearing an/or rupturing.

In the embodiments of FIGS. 2-4 and 6-7 the entrance filter 16 is formed by a flexible sheet-shaped material. More specifically, in all embodiments of FIGS. 2-4 and 6-7 the entrance area 15 is solely formed by the flexible sheet-shaped material. It has been found that in general no supporting structure, such as a substantially rigid grid, e.g. downstream of the entrance foil, is required to support the entrance foil to prevent the entrance foil from tearing and/or rupturing.

In all embodiments of FIGS. 1-7 the exit filter 23 forms the outermost boundary of the capsule 2 in the axial direction thereof.

It will be appreciated that the capsule 2 may comprise any entrance filter according to any one of the shown embodiments in combination with any exit filter according to any one of the shown embodiments. Although not shown, it is possible that the lid comprises a substantially rigid wall provided with the exit openings. Furthermore, it is possible that the entrance filter 16 is formed by a foil such as a flexible polymeric foil provided with a plurality of exit openings.

In general, the exit openings, or pores of the porous sheet, are dimensioned such that a dimension of the opening or pore is sufficiently small to retain non-dissolved soluble substance, inside the capsule 2. Also in general, the entrance openings 17, or pores of the porous sheet, are dimensioned such that a dimension of the opening 17 or pore is sufficiently small to retain non-dissolved soluble substance inside the capsule 2.

Preferably, the circumferential wall 6 is substantially rigid. Hence, the capsule 2 will not be prone to deform by shipping and/or handling, so that the capsule 2 will always fit in the receptacle 4 of the apparatus 3. In addition, the circumferential wall 6 is preferably resilient, so that any possible deformation of the circumferential wall 6 will be reversed once the force causing the deformation is removed. In order to improve rigidity of the capsule 2, the capsule 2 may comprise stiffening ribs integral with the circumferential wall 6. The stiffening ribs may extend from the first end 8 towards the second end 10. Alternatively, or additionally, the stiffening ribs may extend in a circumferential direction. When the bottom 7 is integral with the circumferential wall 6, the stiffening ribs may also be integral with the bottom 7.

In the examples the circumferential wall 6 is substantially frustoconical. It will be appreciated that the capsule 2 according to the invention is not limited to this shape. The circumferential wall may e.g. be cylindrical, hemispherical, or polygonal, such as hexagonal, octagonal, etc.

It will be appreciated that the capsules 2 referred to hereinabove may also be used in alternative apparatus for preparing the beverage, for instance in apparatus not provided with the bottom piercing means 12 and/or not provided with the lid piercing means 22.

In the foregoing specification, the invention has been described with reference to specific examples of embodiments of the invention. It will, however, be evident that various modifications and changes may be made therein without departing from the broader spirit and scope of the invention as set forth in the appended claims.

It is for instance possible that the capsule 2 is contained in an air-tight wrapping prior to use to improve shelf-life.

It is also possible that the bottom comprises a recessed area for receiving the bottom piercing means without the bottom being pierced, for increasing the capsule volume.

In above examples, the exit filter forms the lid. It is also possible that the exit filter forms part of the lid. The lid may for instance be partially porous and/or partially perforate.

In above examples, the entrance filter forms the bottom. It is also possible that the entrance filter forms part of the bottom. The bottom may for instance be partially porous and/or partially perforate.

Preferably, the exchangeable capsule is disposable after single use.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. An exchangeable capsule and an apparatus comprising a receptacle for holding the exchangeable capsule, said exchangeable capsule for preparing a predetermined quantity of beverage suitable for consumption, the exchangeable capsule comprising:
    a circumferential wall, a bottom, closing the circumferential wall at a first end, and a lid closing the circumferential wall at a second end opposite the bottom,
    wherein the wall, the bottom and the lid enclose an inner space comprising beverage ingredient for preparing the beverage,
    wherein the bottom comprises an entrance area for supplying fluid to the ingredient, wherein the lid comprises an exit area for draining beverage from the exchangeable capsule,
    wherein the beverage ingredient comprises at least a soluble substance, and
    wherein the apparatus comprises a fluid dispensing device for supplying an amount of fluid under pressure to the exchangeable capsule via an entrance area of the exchangeable capsule, wherein an exit area of the exchangeable capsule is adapted to cooperate with an outlet of the receptacle to drain the beverage from the exchangeable capsule into a container,
    wherein the receptacle comprises lid piercing means intended for piercing an exit area of an alternative hermetically sealed capsule further comprising an entrance area, when the exit area of the alternative capsule sufficiently presses against the lid piercing means under the influence of the pressure of the fluid and/or beverage in the alternative capsule for creating at least one exit opening through which the beverage can drain,
    wherein the exit area of the exchangeable capsule comprises an exit filter that is adapted to substantially prevent non-dissolved soluble substance from leaving the exchangeable capsule, and wherein the exit filter is formed by a perforate flexible foil layer provided with a plurality of exit openings and wherein the perforate flexible foil has a tear strength such that when pressed against the lid piercing means of the apparatus the perforate flexible foil does not tear or rupture and the lid stays intact.

2. The exchangeable capsule and apparatus according to claim 1, wherein the perforate layer is a polymeric film provided with a plurality of exit openings.

3. The exchangeable capsule and apparatus according to claim 1, wherein the soluble substance is at least one of instant chocolate powder, instant coffee powder, instant milk powder, and an instant flavoring powder.

4. The exchangeable capsule and apparatus according to claim 3, wherein the beverage ingredient additionally comprises an extractable ingredient.

5. The exchangeable capsule and apparatus according to claim 1, wherein the entrance area comprises an entrance filter or a perforate sheet provided with a plurality of entrance openings, for supplying the fluid to the extractable product there through.

6. The exchangeable capsule and apparatus according to claim 1, wherein the entire inner space is occupied by the at least one beverage ingredient.

7. The exchangeable capsule and apparatus according to claim 1, wherein the circumferential wall is substantially rigid.

8. The exchangeable capsule and apparatus according to claim 1, wherein the exchangeable capsule comprises an outwardly extending rim at the second end, wherein the lid is attached to the outwardly extending rim.

9. The exchangeable capsule and apparatus according to claim 8, wherein the exit filter is attached to the outwardly extending rim.

10. The exchangeable capsule and apparatus according to claim 1, wherein the exit filter is part of the lid, wherein an exit filter surface is smaller than a lid surface.

11. The exchangeable capsule and apparatus according to claim 1, wherein the exchangeable capsule further comprises a lid seal and/or a bottom seal at least partially removable connected the lid and/or the bottom, respectively, for sealing the exit filter and/or the entrance filter, respectively, prior to use.

12. The exchangeable capsule and apparatus according to claim 1, wherein the circumferential wall is cylindrical, hemispherical, frustoconical or polygonal.

13. The exchangeable capsule and apparatus according to claim 1, wherein the exchangeable capsule is biodegradable.

14. The exchangeable capsule and apparatus according to claim 1, wherein the fluid dispensing device is arranged for supplying the fluid to the exchangeable capsule under a pressure of approximately 4-20 bars.

15. The apparatus and exchangeable capsule of claim 1, wherein there is no additional supporting structure within the inner space of the exchangeable capsule.

16. The apparatus and exchangeable capsule of claim 1, wherein the perforate flexible foil with the plurality of exit openings spans substantially the entire exit area of the exchangeable capsule.

17. The apparatus and exchangeable capsule of claim 1, wherein the lid piercing means engage the exit filter such that the exit filter deforms against the lid-piercing means.

18. An exchangeable capsule and an apparatus comprising a receptacle for holding the exchangeable capsule, said exchangeable capsule for preparing a predetermined quantity of beverage suitable for consumption, the exchangeable capsule comprising:

a circumferential wall, a bottom, closing the circumferential wall at a first end, and a lid closing the circumferential wall at a second end opposite the bottom, wherein the wall, the bottom and the lid enclose an inner space comprising beverage ingredient for preparing the beverage, wherein the bottom comprises an entrance area for supplying fluid to the ingredient, wherein the lid comprises an exit area for draining beverage from the exchangeable capsule, wherein the beverage ingredient comprises at least a soluble substance, and wherein the apparatus comprises a fluid dispensing device for supplying an amount of fluid under pressure to the exchangeable capsule via an entrance area of the exchangeable capsule, wherein an exit area of the exchangeable capsule is adapted to cooperate with an outlet of the receptacle to drain the beverage from the exchangeable capsule into a container, wherein the receptacle comprises lid piercing means intended for piercing an exit area of an alternative hermetically sealed capsule further comprising an entrance area, when the exit area of the alternative capsule sufficiently presses against the lid piercing means under the influence of the pressure of the fluid and/or beverage in the alternative capsule for creating at least one exit opening through which the beverage can drain, wherein the exit area of the exchangeable capsule comprises an exit filter that is adapted to substantially prevent non-dissolved soluble substance from leaving the exchangeable capsule, and wherein the exit filter is formed by a perforate flexible foil layer provided with a plurality of exit openings and wherein the perforate flexible foil has a tear strength such that when pressed against the lid piercing means of the apparatus the perforate flexible foil does not tear or rupture and the lid stays intact;

wherein there is no additional supporting structure within the inner space of the exchangeable capsule;

wherein the perforate flexible foil with the plurality of exit openings spans substantially the entire exit area of the exchangeable capsule;

wherein the lid piercing means engage the exit filter such that the exit filter deforms against the lid-piercing means.

* * * * *